(12) United States Patent
Pan et al.

(10) Patent No.: US 8,978,509 B2
(45) Date of Patent: Mar. 17, 2015

(54) ROBOT ARM ASSEMBLY

(75) Inventors: Xiao-Peng Pan, Shenzhen (CN);
Chao-Qiang Liu, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 252 days.

(21) Appl. No.: 13/552,586

(22) Filed: Jul. 18, 2012

(65) Prior Publication Data

US 2013/0112031 A1    May 9, 2013

(30) Foreign Application Priority Data

Nov. 4, 2011    (CN) .......................... 2011 1 0345364

(51) Int. Cl.
| | | |
|---|---|---|
| B25J 17/00 | (2006.01) | |
| B25J 17/02 | (2006.01) | |
| B25J 18/00 | (2006.01) | |
| B25J 9/10 | (2006.01) | |

(52) U.S. Cl.
CPC ...................................... *B25J 9/101* (2013.01)
USPC ..................................................... 74/490.05

(58) Field of Classification Search
CPC ........ B25J 17/00; B25J 18/04; B25J 19/0075; B25J 9/101
USPC ........................................... 74/490.01, 490.05
See application file for complete search history.

(56) References Cited

U.S. PATENT DOCUMENTS

| | | | | |
|---|---|---|---|---|
| 5,193,658 | A | * | 3/1993 | Tellden ......................... 192/138 |
| 6,065,364 | A | * | 5/2000 | Shiraki et al. ............... 74/490.01 |
| 7,464,623 | B2 | * | 12/2008 | Okada et al. ............... 74/490.05 |
| 7,591,206 | B2 | * | 9/2009 | Yamamoto et al. ......... 74/490.01 |
| 7,680,551 | B2 | * | 3/2010 | Ikeda et al. ...................... 700/57 |
| 8,534,154 | B2 | * | 9/2013 | Li et al. ...................... 74/490.05 |
| 8,763,488 | B2 | * | 7/2014 | Reekers ...................... 74/490.01 |
| 2009/0044655 | A1 | * | 2/2009 | DeLouis et al. ............ 74/490.05 |
| 2010/0178101 | A1 | * | 7/2010 | Day et al. ....................... 403/112 |

FOREIGN PATENT DOCUMENTS

| | | |
|---|---|---|
| CN | 101774179 A | 7/2010 |
| CN | 102114637 A | 7/2011 |
| JP | 1-210289 A | 8/1989 |

\* cited by examiner

*Primary Examiner* — Justin Krause
(74) *Attorney, Agent, or Firm* — Novak Druce Connolly Bove + Quigg LLP

(57) ABSTRACT

A robot arm assembly includes a main base, a joint and at least one arm. The main base includes a main body, and the main body includes a mounting portion and a limiting post on a side of the mounting portion. The joint is rotatably mounted on the mounting portion and includes a limit piece corresponding to the limiting post. The at least one arm is fixed to the joint, when the arm rotates relative to the main base to a predetermined extent of rotation, the limit piece abuts against the limiting post to stop the rotation of the arm.

3 Claims, 7 Drawing Sheets

ROBOT ARM ASSEMBLY

BACKGROUND

1. Technical Field

The present disclosure relates to an industrial robot, and more particularly, to a robot arm assembly configured with a limitation structure.

2. Description of Related Art

An industrial robot includes a plurality of arms rotatably connected to each other in order, thus, a movement of multiple axis is achieved. However, one arm may rotate around another arm in many circles due to miss-operation, thus braking or damaging the cables mounted in the industrial robot.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
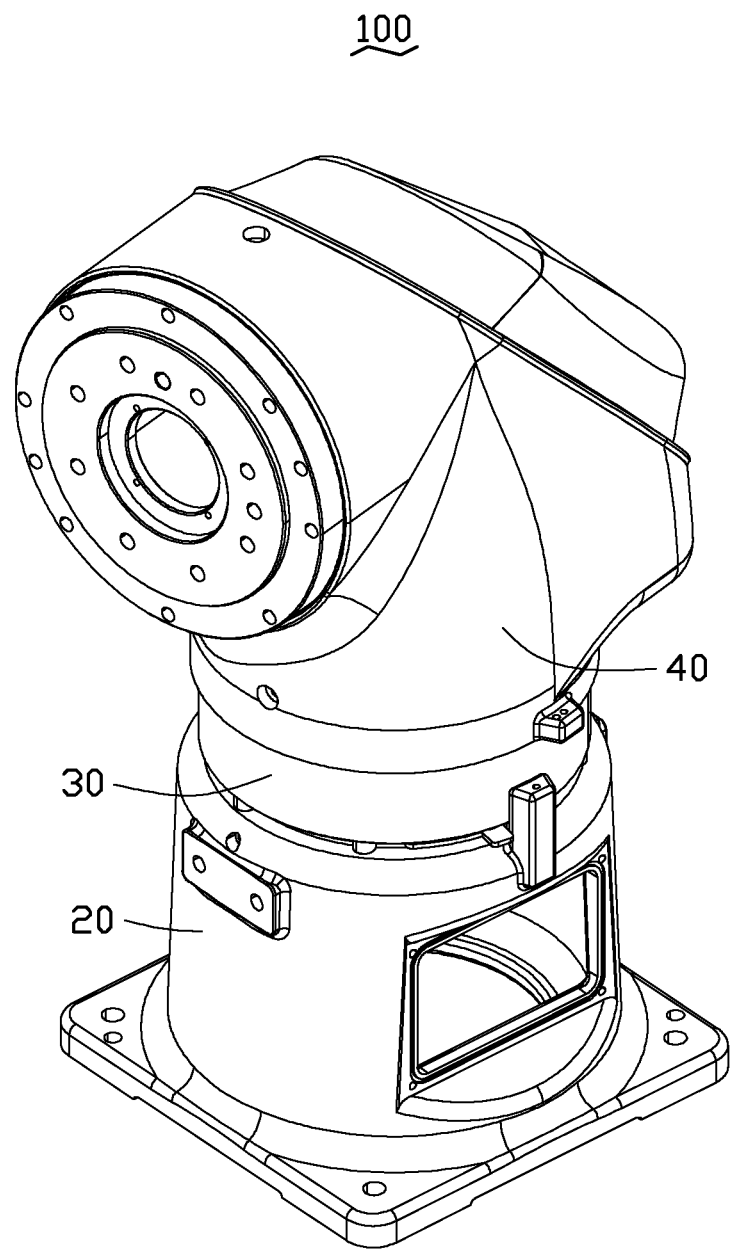
FIG. 1 is an isometric view of a first embodiment of a robot arm assembly.
Figure 2:
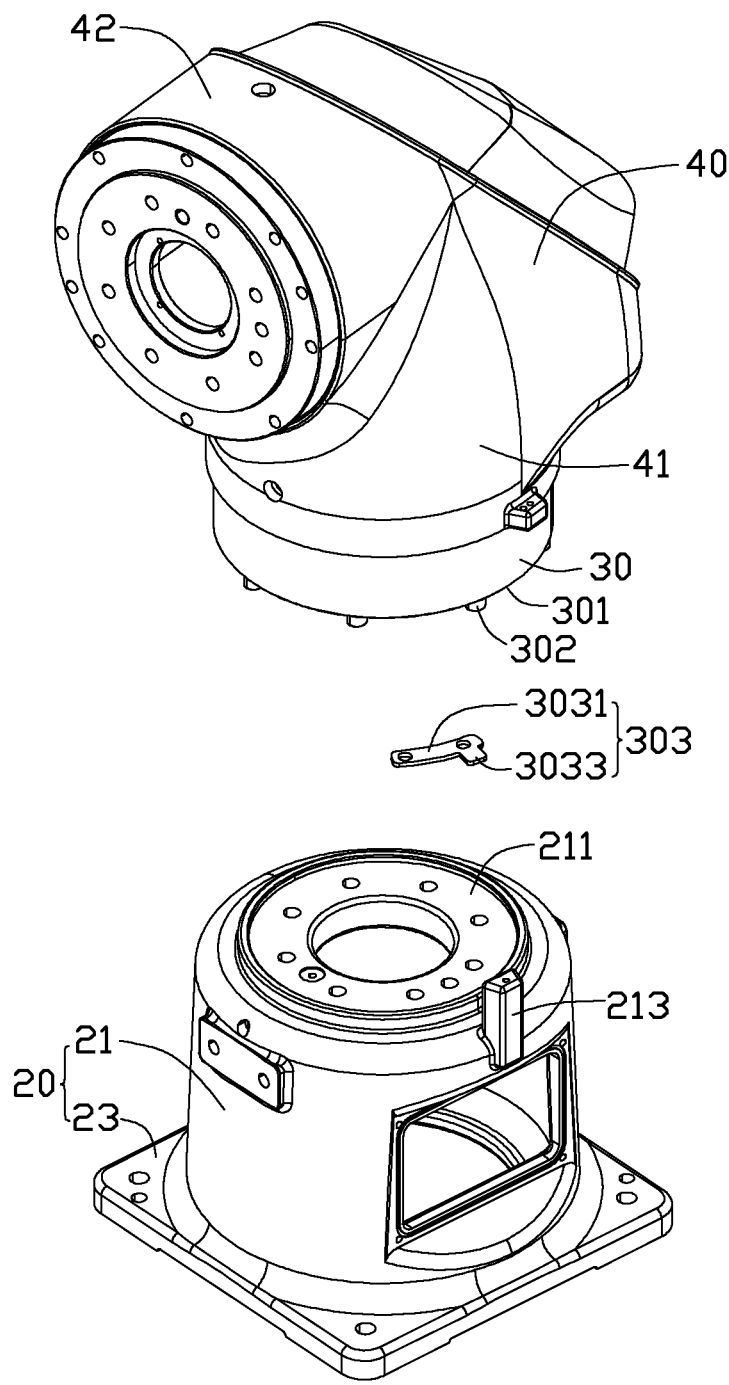
FIG. 2 is an exploded, isometric view of the robot arm assembly of FIG. 1.
Figure 3:
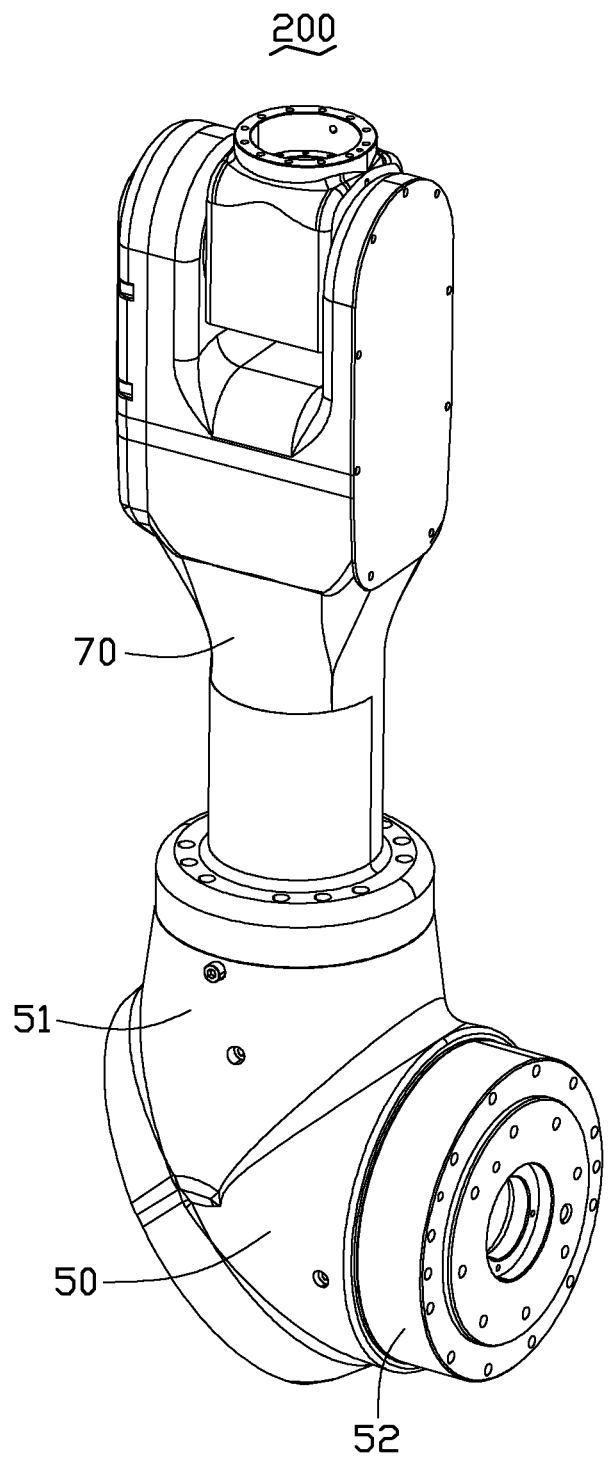
FIG. 3 is an isometric view of a second embodiment of a robot arm assembly.
Figure 4:
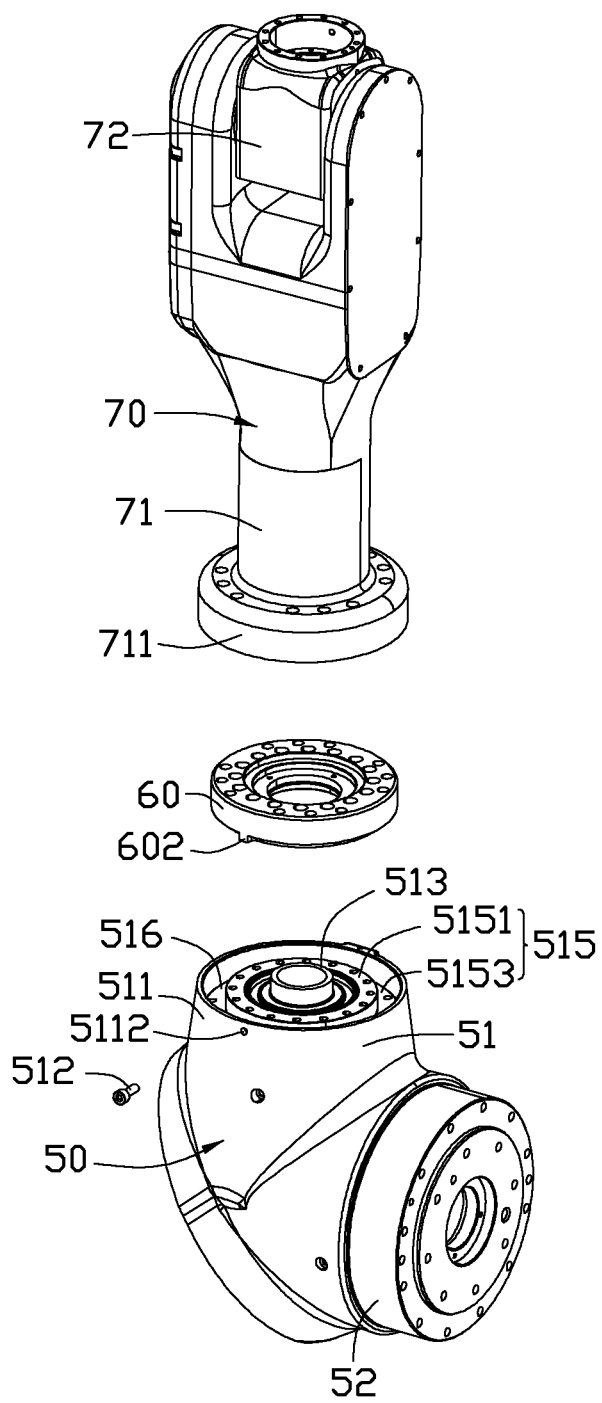
FIG. 4 is an exploded, isometric view of the robot arm assembly of FIG. 3.
Figure 5:
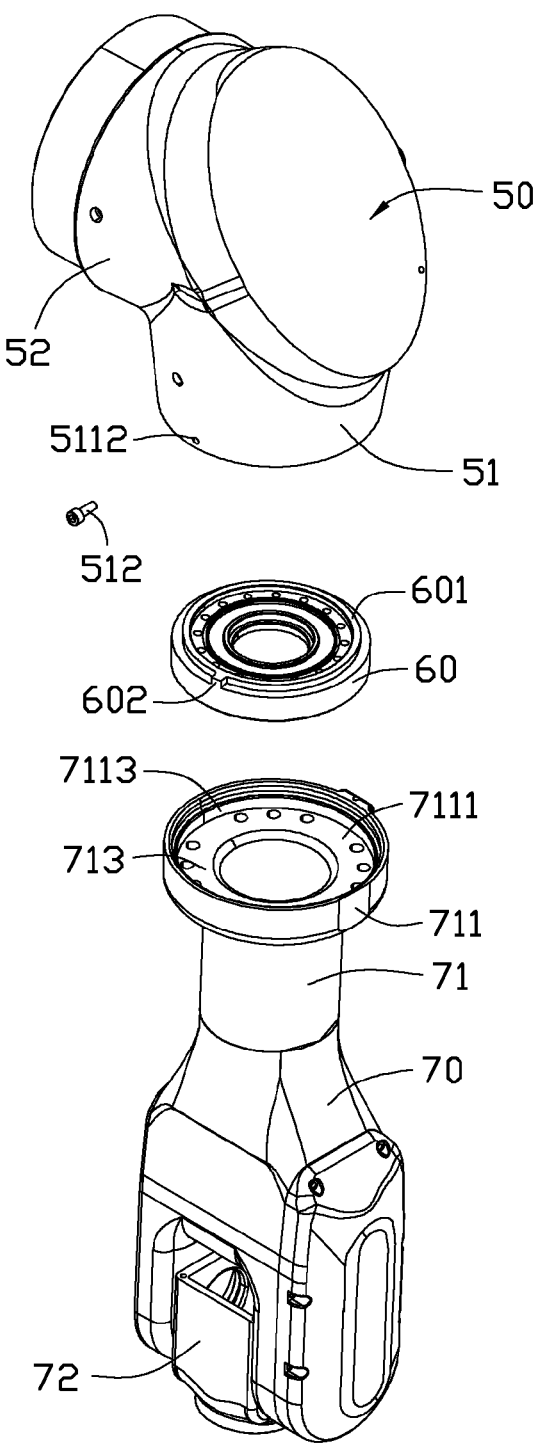
FIG. 5 is similar to FIG. 4, but viewed from another aspect.
Figure 6:
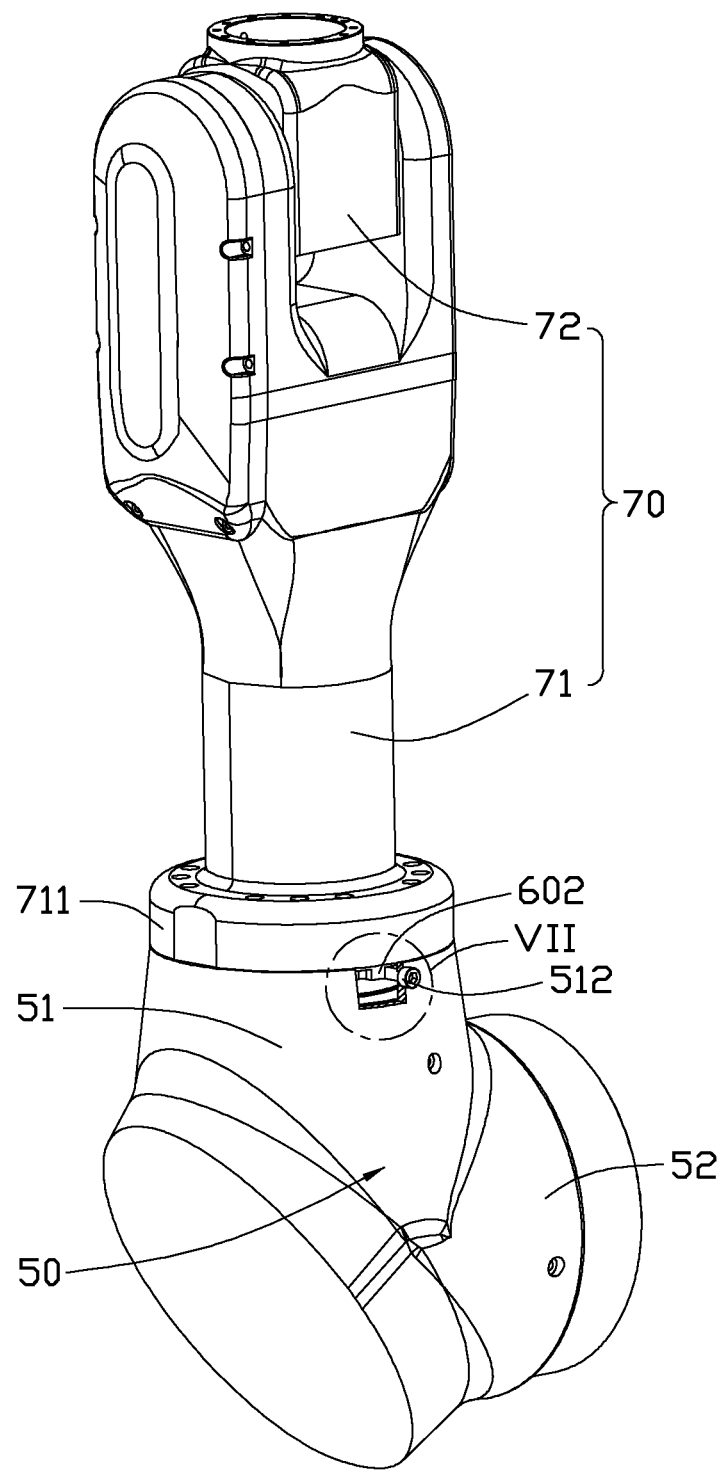
FIG. 6 is similar to FIG. 3, but shows a rotated isometric view from another aspect.
Figure 7:
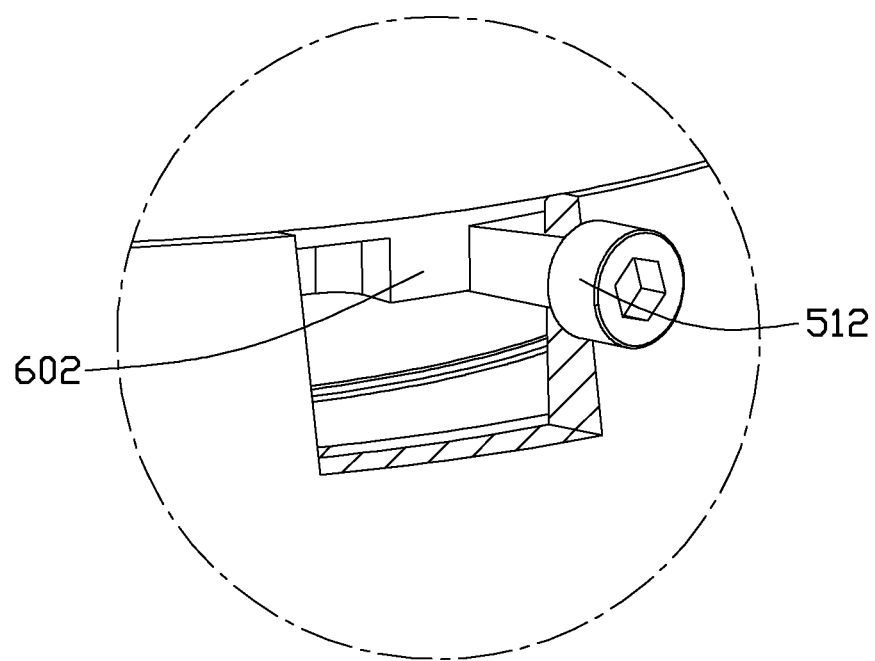
FIG. 7 is an enlarged view of the circled portion VII of the FIG. 6.

FIGS. 1 and 2, illustrate a first embodiment of a robot arm assembly 100. The robot arm assembly 100 includes a main base 20, a joint 30 and an arm 40. The main base 20 is fixed to the ground or a mounting base (not shown). The joint 30 is rotatably mounted on the main base 20. The arm 40 is securely mounted on the joint 30.

The main base 20 includes a main body 21 and a mount 23. The main body 21 is a hollow cylindrical shell. The mount 23 is a rectangular plate and fixed on the main body 21. The mount 23 is mounted to the ground. The main body 21 includes a mounting portion 211 and a limiting post 213 formed on a side of the mounting portion 211. The mounting portion 211 is located away from the mount 23, the limiting post 213 is substantially a cubic block. The limiting post 213 protrudes away from the mount 23. A height of the limiting post 213 is greater than that of the mounting portion 211.

The joint 30 has an annular shape and is rotatably mounted on the mounting portion 211. The joint 30 defines an end surface 301, and includes a plurality of limit members 302 and a limit piece 303. A diameter of the end surface 301 of the joint 30 is greater than that of the mounting portion 211. The end surface 301 abuts against the mounting portion 211. The plurality of limit members 302 is arranged along a periphery of the end surface 301. The plurality of limit members 302 is capable of latching with an outer side surface of the mounting portion 211. In the embodiment, the plurality of limit members 302 are a plurality of bolts. The limit piece 303 includes a main piece 3031 and a resisting portion 3033 extending from a side of an end of the main piece 3031. The main piece 3031 is in an arc-shape corresponding to the periphery of the end surface 301. The main piece 3031 is fixed to the end surface 301 via one of the plurality of limit members 302. The resisting portion 3033 extends out of the end surface 301 along a radial direction of the end surface 301 for latching with the limiting post 213.

The arm 40 includes a first connecting portion 41 and a second connecting portion 42 perpendicular to the first connecting portion 41. The first connecting portion 41 is secured to the joint 30. The second connecting portion 42 connects with another arm (not shown).

The robot arm assembly 100 further includes a driving assembly (not shown) and a sensor (not shown). The driving assembly is capable of driving the joint 30 to rotate relative to the main base 20. The sensor is capable of starting or stopping the driving assembly.

When in assembly, the first connecting portion 41 of the arm 40 is connected to the joint 30. The end surface 301 rotatably abuts against the mounting portion 211. The plurality of limit members 302 latches with the periphery of the mounting portion 211. The resisting portion 3033 protrudes out of the end surface 301.

When in use, the driving assembly drives the joint 30 to rotate relative to the main base 20. The resisting portion 3033 resists against the limiting post 213. Then the sensor receives the signal and stops the driving assembly. The joint 30 stops rotating, and thus the robot arm assembly 100 can prevent the arm 40 from making multiple number of rotations, thereby avoiding rupture of cables.

FIGS. 3 through 7, illustrate a second embodiment of a robot arm assembly 200. The robot arm assembly 200 includes a first arm 50, a joint 60 and a second arm 70. The joint 60 is fixed to the second arm 70 and rotatably connected to the first arm 50. The first arm 50 includes a first shaft portion 51 and a second shaft portion 52 perpendicularly connected to the first shaft portion 51. The first shaft portion 51 is rotatably connected to the joint 60, and the second shaft portion 52 is connected to a tool (not shown).

The first shaft portion 51 includes a sleeve 511, a limit rod 512, an output shaft 513 and a mounting member 515. The limit rod 512 extends into the sidewall of the sleeve 511. The output shaft 513 is rotatably received in the sleeve 511 and arranged along an axis of the sleeve 511. The mounting member 515 is sleeved on the output shaft 513 and fixed to the sleeve 511. The output shaft 513 is capable of rotating relative to the mounting member 515. In the embodiment, the limit rod 512 is a screw.

The mounting member 515 is configured and used for mounting the joint 60. The mounting member 515 has a hollow structure, and includes a first mounting portion 5151 and a second mounting portion 5153 extending from a periphery of an end of the first mounting portion 5151. The second mounting portion 5153 is connected to an inner side surface of the sleeve 511. The first mounting portion 5151 is sleeved on the output shaft 513. The first mounting portion 5151 and the inner side surface of the sleeve 511 cooperatively define a receiving groove 516 therein.

The sleeve 511 defines a through hole 5112 at a side surface thereof for receiving an end of the limit rod 512.

The joint 60 is securely sleeved on the output shaft 513. The joint 60 is in a ring shape and includes a latching portion 601 facing the first arm 50. The latching portion 601 is annular and sleeved on an end of the first mounting portion 5151. The joint 60 further includes a limit portion 602 extending from a periphery of the latching portion 601 to a periphery of the joint 60. The limit portion 602 is movably received in the receiving groove 516 and resists against the limit rod 512.

The second arm 70 includes a connecting portion 71 and a rotation portion 72. The rotation portion 72 is rotatably connected to an end of the connecting portion 71. The connecting portion 71 includes a connecting end 711 away from the rotation portion 72. The connecting end 711 includes a bottom surface 7111 and a cylindrical side surface 7113 surrounding the bottom surface 7111. The bottom surface 7111 and the side surface 7113 cooperatively form a containing chamber 713. The joint 60 is received from the containing chamber 713, an end surface of the joint 60 is fixed to the bottom surface 7111.

The robot arm assembly 200 further includes a driving assembly (not shown) and a sensor (not shown) received in the first arm 50. The driving assembly is capable of driving the output shaft 513 of the first arm 50 to rotate. The sensor is capable of starting or stopping the driving assembly.

When in assembly, the joint 60 is received in the containing chamber 713 and fixed to the bottom surface 7111 of the connecting end 711. The joint 60 is securely sleeved on the output shaft 513, and the latching portion 601 is sleeved on the first mounting portion 5151. The limit portion 602 is received in the receiving groove 516.

When in use, the driving assembly drives the output shaft 513 of the first arm 50 to rotate. The output shaft 513 drives the joint 60 and the second arm 70 to rotate relative to the first arm 50. When the limit portion 602 abuts against the limit rod 512, the sensor receives the signal and then stops the driving assembly. Thus the second arm 70 is capable of stopping the rotation, and preventing the cables from being damaged.

The mounting member 515 may be omitted, the output shaft 513 then drives the joint 60 and the second arm 70 to rotate. Accordingly, the limit portion 602 should be omitted.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A robot arm assembly, comprising:
    a main base, the main base comprising a main body, wherein the main body comprises a mounting portion and a limiting post formed on a side of the mounting portion;
    a joint rotatably mounted on the mounting portion and comprising:
        a plurality of limit members arranged along a periphery of an end surface of the joint, the plurality of limit members latching with an outer side surface of the mounting portion; and
        a limit piece corresponding to the limiting post; the limit piece comprising:
            a main piece fixed to the joint via one of the plurality of limit members; and
            a resisting portion extending from a side of an end of the main piece; and
    an arm fixed to the joint, wherein when the arm rotates relative to the main base to a predetermined extent, the resisting portion extending out of the end surface of the joint along a radial direction of the end surface for resisting against the limiting post to stop the rotation of the arm.

2. The robot arm assembly of claim 1, wherein the main base further comprise a mount fixed on the main body, the limiting post protrudes from the mount.

3. The robot arm assembly of claim 1, wherein a height of the limiting post is greater than that of the mounting portion.

* * * * *